United States Patent [19]

Henrick

[11] Patent Number: 6,151,137
[45] Date of Patent: *Nov. 21, 2000

[54] FAX BACK CONFIRMATION

[75] Inventor: Robert F. Henrick, Basking Ridge, N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/879,250

[22] Filed: Jun. 19, 1997

[51] Int. Cl.$^7$ ..................................................... H04N 1/00
[52] U.S. Cl. ..................... 358/434; 358/405; 358/407; 379/100.09
[58] Field of Search .................... 379/100.01–100.09, 379/100.17; 358/402–407, 438–440, 434, 435; 395/200, 600

[56] References Cited

U.S. PATENT DOCUMENTS

| | | | |
|---|---|---|---|
| 4,994,926 | 2/1991 | Gordon et al. | 358/400 |
| 5,033,079 | 7/1991 | Catron et al. | 379/100 |
| 5,127,047 | 6/1992 | Bell et al. | 379/100 |
| 5,291,302 | 3/1994 | Gordon et al. | 358/400 |
| 5,377,017 | 12/1994 | Lam | 358/405 |
| 5,404,231 | 4/1995 | Bloomfield | 358/400 |
| 5,410,416 | 4/1995 | Amberg et al. | 358/405 |
| 5,619,725 | 4/1997 | Gordon | 395/839 |
| 5,761,284 | 6/1998 | Ranalli et al. | 379/100.09 |
| 5,862,203 | 1/1999 | Wulkan et al. | 379/114 |

*Primary Examiner*—Kimberly A. Williams
*Assistant Examiner*—Derrick Fields

[57] ABSTRACT

A system and method for providing a status/confirmation report associated with a facsimile message transmitted by an originating facsimile machine over a telecommunications network. A local or first communication path is provided between the originating facsimile machine and a double dialer and a network or second communication path is provided between the double dialer and a point of presence associated with the telecommunications network. The facsimile message is routed over the local and network communication paths from the originating facsimile machine to the point of presence for subsequent transmission to a destination facsimile machine. After receipt of the facsimile message at the point of presence, the local communication path is disconnected while maintaining the connection of the network communication path. The originating facsimile machine is then caused to change from transmission mode to receiving mode and a status/confirmation report is generated and transmitted over the local and network communication paths to the originating facsimile machine.

22 Claims, 2 Drawing Sheets

FAX BACK CONFIRMATION

BACKGROUND OF THE INVENTION

1. Field of the Invention

The present invention relates generally to the field of telecommunications and, more particularly, to a system and method for providing information to a facsimile machine concerning the status of a transmitted facsimile message.

2. Description of the Related Art

Today, facsimile machines are ubiquitous throughout the world and generally provide reliable point-to-point communication. Unfortunately, many facsimile sessions today end without completion of the facsimile message for any of a variety of reasons. One such reason for an incomplete facsimile session is that the destination or receiving facsimile machine may be busy, out of paper or otherwise unavailable. In addition, problems with the telecommunications network (e.g., public switched telephone network (PSTN), Internet or private network), such as noisy or bad connections, may result in dropped calls between the originating or transmitting facsimile machine and the destination facsimile machine. Furthermore, incompatibilities between facsimile machines still occur despite well documented standards for such facsimile machines. In such cases, the originating facsimile machine typically attempts to transmit the facsimile several times, resulting in extended sessions or, in some cases, multiple long distance toll calls.

Advances in network facsimile services exist that provide automatic retry of a facsimile message to a destination facsimile machine without requiring specific action by the user of the originating facsimile machine. This capability can be either an implicit function of the service (e.g., store and forward systems) or can be value added to real time facsimile service, where the network can capture the outgoing facsimile message and take over the effort of completing the facsimile transmission in case of failure. Many of these known network services demodulate and then remodulate the facsimile message modem signal for transmission over a digital packet network and, hence, such network services can easily retain a copy of the facsimile message for delivery in case of an incomplete or failed facsimile session. Such services require the facsimile user to first dial the service, then enter an account number and finally the end destination telephone number. To provide ease of use, the network service provider typically provides a small double dialer to the end user, which intercepts the dialed telephone number (e.g., the number associated with the destination facsimile machine), redirects the call to a separate number for the service facility, and passes the account number and dialed number to the service facility for further processing.

A problem with such network facsimile services which provide automatic delivery of failed or incomplete facsimile messages, however, is the misperception of the user that the facsimile message has been successfully transmitted and the service facility's inability to inform the user of a non-real time delay in completing the facsimile transmission or a scheduled time of completion. The facsimile user receives a confirmation message or report that the originating facsimile machine has completed a successful transmission, which in normal operations originates from the destination facsimile machine. In the case of the network retry system, however, a confirmation report may be misleading because the destination facsimile machine has not yet actually received the facsimile message, but rather the telecommunications network has collected or stored the facsimile message for subsequent delivery. Present facsimile protocols do not allow for any confirmation reports concerning interim action by the service provider or anticipated retry time, and it has not been possible to "turn around" the facsimile session (e.g., from transmission mode to receiving mode) to permit the telecommunications network to transmit a confirmation/status report back to the originating facsimile machine without first terminating the connection with the originating facsimile machine and thereafter initiating a new call.

Although initiating a new call back to the originating facsimile machine may appear simple, it is fraught with disadvantages. First, it may be difficult for the service provider to identify the number associated with the originating facsimile machine because (1) the facsimile user may not have programmed the originating facsimile machine's current number into the header, (2) caller identification may not be available, or (3) the originating facsimile machine may be behind a private branch exchange (PBX). Furthermore, the originating facsimile machine may have a queue of outgoing facsimile messages so that it has initiated another facsimile session before the call back confirmation/status report can be received by the originating facsimile machine. Finally, the network service provider must originate an outgoing call to the originating facsimile machine in order to provide such a confirmation/status report, thereby undesirably increasing the cost of providing the facsimile service.

Similarly, even in real time facsimile transmittal over digital networks, delays in successfully transmitting facsimile messages over the telecommunications network (e.g., facsimile over the Internet) may exceed predetermined duration of current facsimile protocols so that, by the time the facsimile transmission is complete, the connection with the originating facsimile machine has been disconnected before a confirmation/status report may be transmitted by the destination facsimile machine to the originating facsimile machine.

SUMMARY OF THE INVENTION

Thus, an object of the present invention is to provide a highly reliable, inexpensive method and system for telecommunications network facsimile services to provide additional status information back to an originating facsimile machine at a minimal cost to the service provider. The present invention accomplishes this and other objects of the invention and overcomes the problems associated with the prior art through use of a double dialer that is capable of keeping the connection between the originating facsimile machine and the network facsimile facility open so that the facility may transmit a return facsimile confirmation/status report to the originating facsimile machine.

In accordance with the present invention, a system and method of providing a status/confirmation report associated with a facsimile message transmitted by an originating facsimile machine over a telecommunications network comprises a local or first communication path being provided between the originating facsimile machine and a double dialer (the "local path") and providing a network or second communication path between the double dialer and a point of presence associated with the telecommunications network (the "network path"). The outgoing facsimile message is routed over the local and network communication paths from the originating facsimile machine to the point of presence for subsequent transmission to a destination facsimile machine. After receipt of the facsimile message at the point of presence, the local path is disconnected while maintaining the connection of the network path. The originating facsimile machine is then caused to change from transmission mode to receiving mode and a status/confirmation report is generated and transmitted over the local and network communication paths to the originating facsimile machine.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. For example, although the present invention is described with respect to transmission of facsimile messages, it is understood that the present invention is also applicable to transmission of other information, such as accounting or advertising information. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in connection with the accompanying drawings wherein.

DETAILED DESCRIPTION

Figure 1:
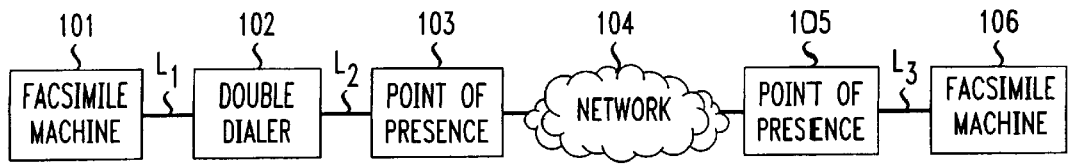
FIG. 1 is a block diagram of a telecommunications system for implementing the present invention.

FIG. 1 is a block diagram of an illustrative facsimile telecommunications system. Two facsimile machines are illustrated in FIG. 1; an originating facsimile machine 101 from which a facsimile message may be transmitted and a destination facsimile machine 106 for receiving the transmitted facsimile message.

While only two facsimile machines are shown in FIG. 1 for illustrative purposes, it is understood that a typical facsimile telecommunications system would generally comprise a greater number of facsimile machines. It is also understood that the originating facsimile machine 101 is also capable of receiving facsimile messages over the facsimile telecommunications system and that the destination facsimile machine 106 is also capable of transmitting facsimile messages over the telecommunications system.

As is illustrated in FIG. 1, the originating and destination facsimile machines 101, 106 are interconnected via telecommunications lines or paths by a telecommunications network 104, which telecommunications network 104 may be for instance the public switched telephone network (PSTN), a local exchange carrier (LEC) telecommunications network, a private or public packet switched telecommunications network (e.g., the Internet or Intranet), other digital packet telecommunications network or a combination thereof. Access to the telecommunications network 104 by the facsimile machines 101, 106 may be accomplished by connecting the originating facsimile machine 101 via a network communication path $L_2$ to a local Point of Presence (POP) 103 for the telecommunications network service provider and connecting the destination facsimile machine 106 via a network communication path $L_3$ to a local POP 105 for the telecommunications network service provider. A preferred POP 103, 105 for use with the present invention is one based on using facsimile boards, computer servers and routers commercially available from any of a number of organizations, such as Arel Communications, Netcentric or NetExchange. The POPs 103, 105 provide a demodulation and remodulation of the facsimile traffic for efficient transfer over a digital network. The typical bandwidth of a facsimile transmission is 9600 BAUD so that demodulation from the analog modem signal and packetization can provide greater efficiencies in communication than utilizing a 64 kilobit per second PSTN circuit. Remodulation of the digital signal into the facsimile modem protocol is required for the POP 105 to complete the call over network communication path $L_3$.

It is understood that either or both facsimile machines 101, 106 may be behind a private branch exchange (PBX) and/or other telecommunications switching system (e.g., LEC telecommunications network). In this case, the network communication paths $L_2$ and $L_3$ represent internal PBX circuits and connect via a local POP 103, 105 to an external long haul network 104 (e.g., the Intranet). For simplicity and illustrative purposes, however, a separate PBX or other telecommunications switching system is not shown in FIG. 1.

The international standards for facsimile transmission are established by the International Telegraph and Telephone Constructive Committee (CCITT), and have been published, for instance, in the CCITT Red Book recommendations T.4, T.5, T.6 and T.30, and in the CCITT Blue Book recommendation T.563. These CCITT standards are well known and will not be discussed in detail.

An automatic double dialer 102 is preferably provided between the originating facsimile machine 101 and the POP 103. The double dialer 102 preferably comprises a Dual Tone Multi-Frequency (DTMF) generator or pulse dialer that serves to connect the originating facsimile machine 101 to the POP 103 over a local or first communication path $L_1$ by automatically dialing the appropriate telephone number to access the POP 103. The double dialer 102 is preferably a conventional digital double dialer that comprises a microprocessor that can be adapted or preprogrammed to perform the steps discussed below in accordance with the present invention. The double dialer 102 may be modified in a manner known to those skilled in the art to include a timer to detect signals from the POP 103 via DTMF or other signalling methodology over the network or second communication path $L_2$. This signalling can instruct the double dialer 102 to hang up the line (i.e., the local communication path $L_1$) for the originating facsimile machine 101, while "artificially" keeping the network communication path $L_2$ open to the POP 103 after the originating facsimile machine 101 transmits the facsimile message. In accordance with the present invention, the double dialer 102 is also preferably modified in a manner known to those skilled in the art to include telecommunications circuitry to permit the double dialer 102 to generate ring voltage to the originating facsimile machine 101 over the local communication path $L_1$ between the double dialer 102 and the originating facsimile machine 101. A preferred double dialer 102 for use with the present invention is a modification of the PAV Call Control Product Line commercially available from Mitel Enterprises.

Figure 2:
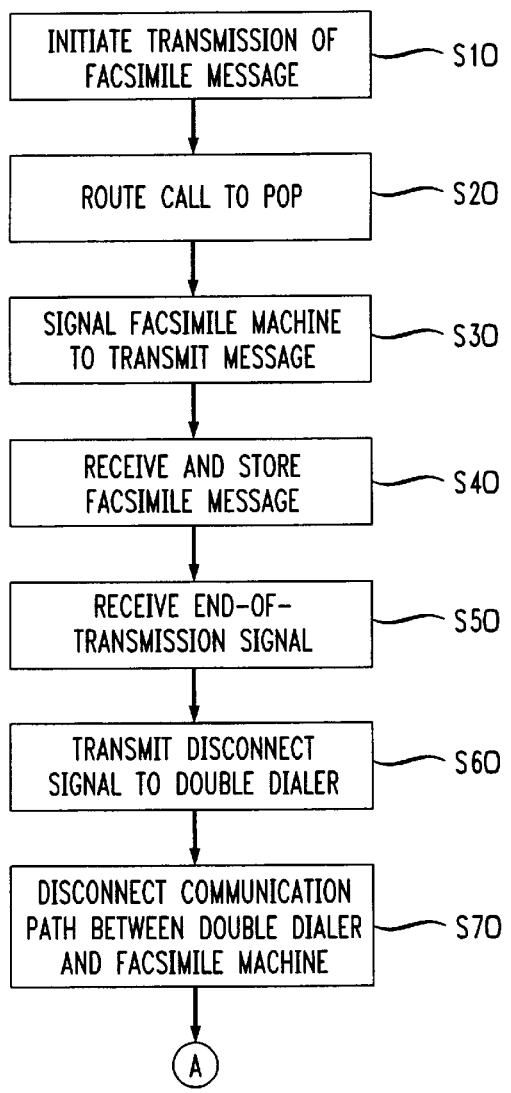
FIGS. 2 and 3 are flow diagrams illustrating the operation of a preferred embodiment of the present invention.
Figure 3:
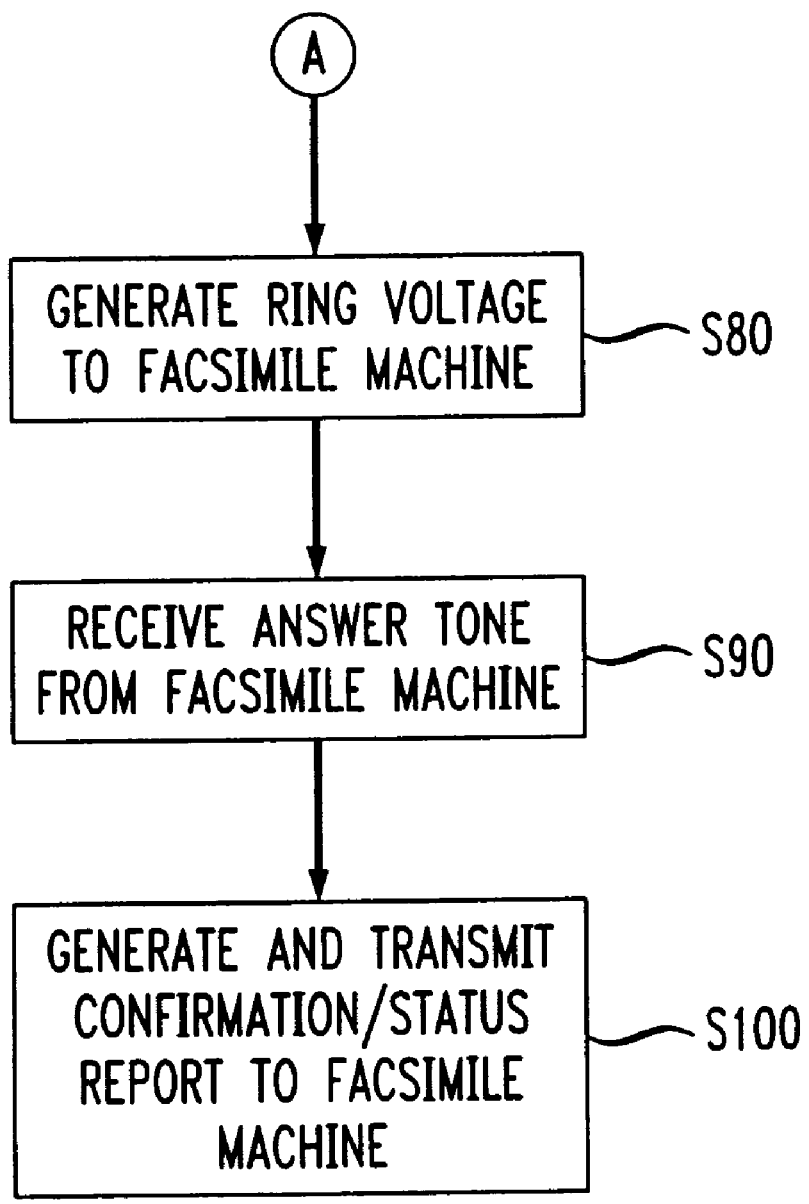

Referring now to FIGS. 2 and 3, the manner in which the present invention operates is described as follows. In step S10, the sender or operator of the originating facsimile machine 101 initiates transmission of a facsimile message in a conventional manner by placing the document(s) to be faxed in the document feeder of the originating facsimile machine 101 and dialing or programming the facsimile machine 101 to dial the telephone number associated with the destination facsimile machine 106. The double dialer 102 intercepts the dialed telephone number associated with the destination facsimile machine 106, and instead dials a separate telephone number associated with the POP 103 to route the call to the facsimile service facility provided by the network service provider (step S20). In addition to routing the facsimile transmission to the POP 103 for processing by the network service provider, the double dialer 102 also transmits the automatic number identification (ANI) or account number associated with the originating facsimile machine 101, the dialed telephone number associated with the destination facsimile machine 106 and any other required data to the POP 103 for further processing by the network service provider.

Once the connection is made between the originating facsimile machine 101 and the POP 103 via the double dialer 102, the POP 103 signals the originating facsimile machine 101 to transmit the facsimile message (intended to be transmitted to the destination facsimile machine 106) to the POP 103 over the local and network communication paths $L_1$ and $L_2$ (step S30). The POP 103 or associated adjunct controlling the facsimile service then receives and stores the facsimile message and associated data in a corresponding database for subsequent transmission to the destination facsimile machine 106 (step S40). Preferably, the POP 103 receives the facsimile message from the originating facsimile machine 101 through a modem associated with the POP 103, demodulates and packetizes the facsimile message, handles billing, call control, addressing and transmits the packetized facsimile message for delivery to the destination facsimile machine 106.

Because the POP 103 may not immediately be able to transmit the facsimile message and/or otherwise complete the facsimile transmission to the destination facsimile machine 106, the present invention enables the POP 103 to transmit a status or confirmation report to the originating facsimile machine 101 in order to apprise the sender of the facsimile message of the current status of the transmitted facsimile message. In accordance with the present invention, this is accomplished in the following manner. Upon receipt of an End-Of-Transmission (EOT) signal from the originating facsimile machine 101 (step S50), the POP 103 first acknowledges the signal with a confirmation and then transmits a disconnect signal to the double dialer 102 to terminate or disconnect the local communication path $L_1$ between the originating facsimile machine 101 and the double dialer 102 (step S60). Upon receipt of this disconnect signal from the POP 103, the double dialer 102 disconnects the local communication path $L_1$ to the originating facsimile machine 101, while maintaining or keeping open the network communication path $L_2$ between the double dialer 102 and the POP 103 (step S70).

The double dialer 102 thereafter generates ring voltage to the originating facsimile machine 101 over local communication path, which ring voltage causes the originating facsimile machine 101 to switch from transmission mode to receiving mode (step S80). That is, the originating facsimile machine 101 answers the call from the double dialer 102 and transmits an answer tone through the double dialer 102 to the POP 103 over the network communication path $L_2$ (step S90). The POP 103 then initiates a send session to the originating facsimile machine 101 using the standard facsimile protocols, wherein the POP 103 generates and transmits a confirmation/status report preferably using an internal facsimile modem in the POP 103 to the originating facsimile machine 101 over communication paths $L_2$ and $L_1$, respectively (step S100). In this manner, the sender of the transmitted facsimile message may be immediately apprised of the current status of the transmitted facsimile message (e.g., confirmation that the transmitted facsimile message was received by the destination facsimile machine 106 or identification of the reason why the transmission of the facsimile message was not completed and when the POP 103 will attempt to try or retry to transmit the stored facsimile message).

Although the present invention is described with respect to transmission of facsimile messages, it is understood that the present invention is also applicable to transmission of other information or data, such as accounting or advertising information.

Although an illustrative preferred embodiment has been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

I claim:

1. A method of providing a status/confirmation report associated with a facsimile message transmitted by an originating facsimile machine over a telecommunications network, the method comprising the steps of:

providing a first communication path between the originating facsimile machine and a double dialer;

providing a second communication path between the double dialer and a point of presence associated with the telecommunications network;

routing the facsimile message over the first and second communication paths from the originating facsimile machine to the point of presence for subsequent transmission to a destination facsimile machine;

disconnecting the first communication path while maintaining the connection of the second communication path;

causing the originating facsimile machine to change from transmission mode to receiving mode; and generating and transmitting the status/confirmation report over the first and second communication paths to the originating facsimile machine.

2. The method according to claim 1, further comprising receiving an end-of-transmission signal from the originating facsimile machine after the facsimile message is transmitted.

3. The method according to claim 2, further comprising the step of transmitting a disconnect signal to the double dialer over the second communication path in response to receipt of the end-of-transmission signal, the disconnect signal instructing the double dialer to disconnect the first communication path while maintaining the second communication path.

4. The method according to claim 3, wherein step of causing the originating facsimile machine to change from transmission mode to receiving mode comprises the steps of:

disconnecting the first communication path;

generating ring voltage over the first communication path between the double dialer and the originating facsimile machine to change the originating facsimile machine from transmitting mode to receiving mode; and receiving an answer tone at the point of presence from the originating facsimile machine over the second communication path.

5. The method according to claim 4, further comprising the step of transmitting an initiate signal over the second communication path to the point of presence to transmit the status/confirmation report in response to receiving the answer tone over the first communication path.

6. The method according to claim 4, wherein the ring voltage is generated by the double dialer.

7. The method according to claim 1, further comprising the step of storing the facsimile message in memory associated with the point of presence.

8. The method according to claim 1, wherein the step of routing the facsimile message over the first and second communication paths comprises the step redirecting the facsimile to the point of presence by dialing a preprogrammed number associated with the point of presence.

9. The method according to claim 1, wherein the facsimile message is automatically routed over the second communication path in response to an unsuccessful attempt to transmit the facsimile message directly to the destination facsimile machine.

10. The method according to claim 1, wherein the status/confirmation report transmitted to the original facsimile machine is in the form of a second facsimile message over the same network connection.

11. The method according to claim 1, further comprising transmitting a second status/confirmation report to the originating facsimile machine upon receipt of the facsimile message by the destination facsimile machine.

12. A system for transmitting a facsimile message from an originating facsimile machine to a destination facsimile machine over a telecommunications network, the system comprising:

a double dialer interconnected with the originating facsimile machine via a first communication path between the originating facsimile machine and the double dialer;

a point of presence associated with the telecommunications network and interconnected with the double dialer via a second communication path between the double dialer and the point of presence, wherein the double dialer routes the facsimile message from the originating facsimile machine over the second communication path to the point of presence for subsequent transmission to the destination facsimile machine;

means for disconnecting the first communication path while maintaining the connection of the second communication path in response to receipt and storage of the facsimile message at the point of presence; and means for causing the originating facsimile to change from transmission mode to receiving mode to facilitate generation and transmission of a status/confirmation report by the point of presence over the first and second communication paths to the originating facsimile machine.

13. The system according to claim 12, wherein the point of presence comprises a store and forward facility adapted to store the facsimile message in memory associated therewith for subsequent transmission to the destination facsimile machine.

14. The system according to claim 12, wherein the double dialer comprises telecommunications circuitry for generating ring voltage across the first communication path to cause the originating facsimile machine to switch from transmission mode to receiving mode.

15. The system according to claim 12, wherein the double dialer is adapted to transmit an initiate signal over the second communication path to the point of presence in response to receiving an answer tone from the originating facsimile machine over the first communication path.

16. The system according to claim 12, wherein the point of presence is adapted to transmit a disconnect signal to the double dialer over the second communication path in response to receipt of an end-of-transmission signal from the originating facsimile machine, the disconnect signal instructing the double dialer to disconnect the first communication path while maintaining the second communication path.

17. The system according to claim 12, wherein the point of presence is adapted to transmit the status/confirmation report to the original facsimile machine in the form of a return facsimile message.

18. The system according to claim 12, wherein the telecommunications network comprises a public switched telecommunications network.

19. The system according to claim 12, wherein the telecommunications network comprises a private switched telecommunications network.

20. The system according to claim 12, wherein the telecommunications network comprises a digital telecommunications network.

21. The system according to claim 12, wherein the telecommunications network comprises the Internet.

22. The system according to claim 12, wherein the telecommunications network comprises the Intranet.

* * * * *